United States Patent [19]

Takigawa et al.

[11] Patent Number: 5,683,950

[45] Date of Patent: Nov. 4, 1997

[54] REFRACTORY FOR CASTING AND METHOD OF MANUFACTURING THE SAME

[75] Inventors: Tadasu Takigawa, Anjo; Etsuhiro Hasebe; Yoichiro Mochizuki, both of Kariya, all of Japan

[73] Assignee: Toshiba Ceramics Co., Ltd., Tokyo, Japan

[21] Appl. No.: 643,590

[22] Filed: May 6, 1996

[30] Foreign Application Priority Data

May 9, 1995 [JP] Japan ................... 7-110811

[51] Int. Cl.⁶ ................ C04B 35/532; C04B 35/482
[52] U.S. Cl. ................ 501/100; 501/105; 501/128; 264/65; 264/296
[58] Field of Search ................ 501/100, 105, 501/128; 264/296, 65

[56] References Cited

U.S. PATENT DOCUMENTS

| | | | |
|---|---|---|---|
| 4,326,040 | 4/1982 | Kaji et al. | 501/100 |
| 4,585,485 | 4/1986 | Shikano et al. | 501/100 |
| 4,830,992 | 5/1989 | Ichikawa et al. | 501/100 |
| 5,214,010 | 5/1993 | Whittemore | 501/105 |

FOREIGN PATENT DOCUMENTS

| | | |
|---|---|---|
| 63-117950 | 5/1988 | Japan . |
| 405319915A | 12/1993 | Japan . |
| 6-219824 | 8/1994 | Japan . |

Primary Examiner—Karl Group
Attorney, Agent, or Firm—Foley & Lardner

[57] ABSTRACT

Provided is a refractory for casting which contains clinker having a mineral crystal phase consisting essentially of mullite and baddeleyite. The refractory for casting has excellent in a thermal-shock resistance, corrosion resistance and strength. The refractory for casting is manufactured from a raw material containing a refractory composition and an organic binder, wherein the refractory composition comprises (a) 3 to 60 wt % of clinker having a mineral crystal phase consisting essentially of mullite and baddeleyite, and containing 5 to 22 wt % of alumina ($Al_2O_3$), 38 to 68 wt % of zirconia ($ZrO_2$) and 27 to 40 wt % of silica;

(b) 5 to 40 wt % of at least one carbon-based material selected from the group consisting of graphite and carbon; and (c) at least one refractory element as a balance, selected from the group consisting of alumina, fused silica, zirconia, silicon carbide, mullite and a metal silicon.

8 Claims, 1 Drawing Sheet

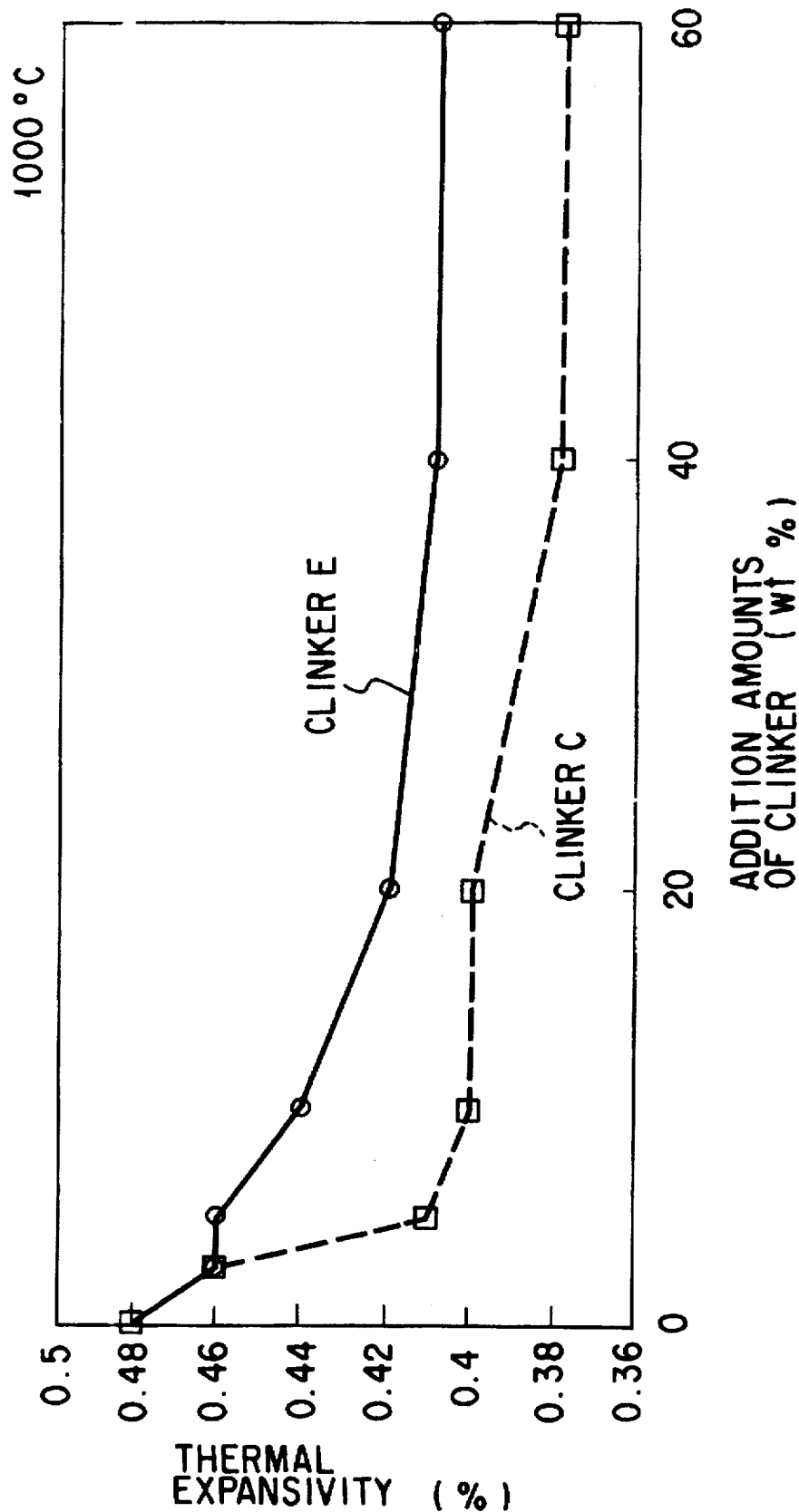
FIGURE

REFRACTORY FOR CASTING AND METHOD OF MANUFACTURING THE SAME

BACKGROUND OF THE INVENTION

1. Field of the Invention

The present invention relates to a refractory for casting and a method of manufacturing the same.

2. Description of the Related Art

A refractory for casting such as a nozzle and side-gate or the like which are usually used in casting steels is conventionally made of an alumina-graphite refractory material, a zirconia-graphite refractory material or the like. However, such casting refractories have a problem in that they have neither satisfactory thermal-shock resistance not satisfactory corrosion resistance. Furthermore, the refractories for casting, i.e., nozzles, side-gate or the like have another problem in that alumina precipitates depending on a steel type used in the nozzles, blocking the hole of the nozzles, side-gate or the like.

Jpn. Pat. Appln. KOKAI Publication No.63-117950 discloses a method of manufacturing a plate brick for a slide gate. The method comprises the steps of mixing (a) 46 to 85 wt % of a refractory material which includes a mineral phase mainly consisting of mullite and baddeleyite and containing $Al_2O_3$ 30 to 65 wt %, $ZrO_2$ 25 to 45 wt % and $SiO_2$ 10 to 25 wt % and (b) 3 to 12 wt % of graphite and/or carbon, kneading and molding the mixture, and sintering the molded body. However, the brick fails to have a satisfactory thermal-shock resistance since it contains alumina as high as 30 to 45 wt % in the refractory material. In addition, the corrosion resistance and strength of the brick are unsatisfactory. This is because micro-cracks are generated by a reversible crystal transition of the baddeleyite, and further developed into cracks, in which remains unfilled.

SUMMARY OF THE INVENTION

An object of the present invention is to provide a refractory for casting and a method of manufacturing the refractory for casting which contains clinker having a mineral crystal phase mainly made of mullite and baddeleyite and prepared by reducing an alumina content and conversely increasing a silica content. The refractory is excellent in a thermal-shock resistance, corrosion resistance and strength.

According to the present invention, there is provided a refractory for casting manufactured from a raw material containing a refractory composition and an organic binder, wherein the refractory composition comprises (a) 3 to 60 wt % of clinker having a mineral crystal phase consisting essentially of mullite and baddeleyite, and containing 5 to 22 wt % of alumina ($Al_2O_3$), 38 to 68 wt % of zirconia ($ZrO_2$) and 27 to 40 wt % of silica;

(b) 5 to 40 wt % of at least one carbon-based material selected from the group consisting of graphite and carbon with the proviso that when the organic binder is remained in the form of carbon after sintering, the carbon remained is included in the carbon-based material; and (c) at least one refractory element as a balance selected from the group consisting of alumina, fused silica, zirconia, silicon carbide, mullite and a metal silicon, with the proviso that silicon carbide is used at most 30 wt % and a metal silicon is used at most 10 wt %.

According to the present invention, there is provided a method of manufacturing a refractory for casting comprises the steps of:

mixing and kneading a raw material containing an organic binder and a refractory composition containing:

(a) 3 to 60 wt % of clinker having a mineral crystal phase consisting essentially of mullite and baddeleyite, and containing 5 to 22 wt % of alumina ($Al_2O_3$), 38 to 68 wt % of zirconia ($ZrO_2$) and 27 to 40 wt % of silica;

(b) 5 to 40 wt % of at least one carbon-based material selected from the group consisting of graphite and carbon with the proviso that when the organic binder is remained in the form of carbon after sintering, the carbon remained is included in the carbon-based material; and (c) at least one refractory element as a balance selected from the group consisting of alumina, fused silica, zirconia, silicon carbide, mullite and a metal silicon, with the proviso that silicon carbide is used at most 30 wt % and a metal silicon is used at most 10 wt %.

molding the mixture; and sintering a molded body at 800° to 1200° C. in a non-oxidizing atmosphere or with breeze.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates presently preferred embodiments of the invention and, together with the general description given above and the detailed description of the preferred embodiments given below, serves to explain the principles of the invention.

FIGURE is a characteristic graph showing the relationship between a clinker content and a thermal expansivity of the refractories for casting containing the clinker.

DETAILED DESCRIPTION OF THE PREFERRED EMBODIMENTS

Hereinbelow, the present invention will be described in detail.

The refractory for casting according to the present invention is manufactured from a raw material containing an organic binder and a refractory composition. The refractory composition contains:

(a) 3 to 60 wt % of clinker having a mineral crystal phase consisting essentially of mullite and baddeleyite, and containing 5 to 22 wt % of alumina ($Al_2O_3$), 38 to 68 wt % of zirconia ($ZrO_2$) and 27 to 40 wt % of silica;

(b) 5 to 40 wt % of at least one carbon-based material selected from the group consisting of graphite and carbon with the proviso that when the organic binder is remained in the form of carbon after sintering, the carbon remained is included in the carbon-based material; and (c) at least one refractory element as a balance selected from the group consisting of alumina, fused silica, zirconia, silicon carbide, mullite and a metal silicon, with the proviso that silicon carbide is used at most 30 wt % and a metal silicon is used at most 10 wt %.

Hereinbelow, we will set forth the functions of individual components constituting the refractory composition and the reasons why the contents of the individual components are defined to fall within the ranges described above.

1) Refractory composition; clinker and carbon-based material and refractory components a) Clinker Clinker has a mineral crystalline phase consisting essentially of a mullite and a baddeleyite. In the baddeleyite, micro-cracks are generated by a volume shrinkage and volume expansion respectively caused by the crystal transition of a monoclinic system to a tetragonal system by heating and the crystal transition from a tetragonal system to a monoclinic system by cooling to room temperature. Owing to the presence of the micro-cracks, the thermal-shock resistance of the refractory for casting is improved. When a content of clinker is less than 3 wt %, it is difficult to obtain a refractory for casting excellent in a thermal expansion (the smaller, the better), corrosion resistance, and thermal-shock resistance. On the other hand, when the clinker content exceeds 60 wt %, the corrosion resistance of the refractory for casting conversely decreases. The clinker is preferably contained in an amount of 5 to 55 wt % and more preferably 10 to 40 wt %.

a-1) alumina ($Al_2O_3$)

If alumina is contained in an amount of less than 5 wt % in the clinker, it will be difficult to impart an excellent corrosion resistance inherent in alumina to a refractory for casting. On the other hand, if a content of alumina exceeds 22 wt %, the effects offered by reducing the thermal expansivity of the refractory for casting, will hardly be provided. If alumina is contained in an amount within the range of 5 to 22 wt %, the thermal expansivity can be reduced while a sufficient corrosion resistance of a refractory for casting is obtained. Alumina is more preferably contained in an amount of 10 to 20 wt %.

a-2) zirconia ($ZrO_2$)

If zirconia is contained in an amount of less than 38 wt % in the clinker, a volume shrinkage and volume expansion due to reversible transition of the baddeleyite between a monoclinic system and a tetragonal system will produce less effect. Consequently, the thermal-shock resistance of the refractory for casting is hardly improved. On the other hand, if the content of zirconia exceeds 68 wt %, the thermal expansivity of a refractory for casting will be too large. Therefore, the thermal-shock resistance of the casting refractory is hardly improved. Zirconia is more preferably contained in an amount of 45 to 60 wt %.

a-3) Silica ($SiO_2$)

Silica contained in the clinker is responsible for producing mullite by reacting with alumina. In this invention, silica is contained excessively in the range of 27 to 40 wt %. The excessive silica is present in the form of a glass phase and fill the cracks developed from micro-cracks which are produced by crystal transition of a baddeleyite of the clinker. In this manner, the excessive silica prevents the strength reduction and collapse of the particles constituting the refractory for casting. Silica can further improve the thermal-shock resistance of the refractory for casting since it has low thermal expansivity. It is therefore preferable that the lowermost silica content of the clinker be 27 wt %, which is higher than those used in conventional refractory for casting. However, if the content of silica is too large, the corrosion resistance of the refractory for casting will decrease. Hence, the uppermost content of silica is preferably set at 40 wt %. Silica is more preferably contained in an amount of 28 to 35 wt %.

b) Carbon-based material

At least one carbon-based material selected from the group consisting of graphite and carbon has a property hard to be wet with a molten steel or a slug. The carbon-based material further has a high heat-conductivity and a low thermal expansivity. In the case where an organic-based binder left amorphous carbon after being sintering, the amorphous carbon must be included in the carbon-based material. If the content of the carbon-based material is less than 5 wt %, it will be difficult to obtain a refractory for casting having a good thermal-shock resistance. In contrast, if the content of the carbon-based material exceeds 40 wt %, the corrosion resistance of the refractory for casting will decrease. As explained above, the content of the carbon-based material must be set in consideration of the balance between thermal-shock resistance and corrosion resistance. The carbon-based material is more preferably contained in an amount of 8 to 30 wt %.

c) Refractory component

The refractory component is at least one element selected from the group consisting of alumina, molten silica, zirconia, silicon carbide, mullite and a metal silicon. In the case where silicon carbide is used as a refractory component, the content of silicon carbide must be 30 wt % or less. If the content of silicon carbide exceeds 30 wt %, the corrosion resistance of a refractory for casting will decrease. On the other hand, in the case where a metal silicon is used as the refractory component, the content of the metal silicon must be set at 10 wt % or less. If the content of the metal silicon exceeds 10 wt %, the corrosion resistance of a refractory for casting will decrease.

As the organic binder, for example, a phenol resin, a furan resin, xylene-formaldelyde resin, urea resin, or epoxy resin may be used. The organic binder is preferably contained in an amount of 3 to 25 wt % relative to the amount of the refractory composition.

The refractory for casting of the present invention is manufactured by the steps of mixing and kneading a raw material containing the refractory composition and organic binder, molding the raw material and sintering the molded body at 800° to 1200° C. in a non-oxidizing atmosphere or with breeze. The sintering means firing, too.

As a molding means of the raw material, for example, hydrostatic pressure, oilhydraulic press, frictioning press, or the like may be used.

Examples of the non-oxidizing atmosphere include a hydrogen gas, nitrogen gas, argon gas or a mixture gas of these. The sintering may be performed with breeze. If means for example sinstering the molded body with carbon or coke breeze in a casing.

If the sintering is performed at a temperature less than 800° C., a refractory for casting cannot be sufficiently sintered. On the other hand, if the molding body is sintered at a temperature exceeding 1200° C., advantages obtained at high-temperature sintering will not be offered and a manufacturing cost will increase.

The refractory for casting according to the present invention set forth in the above is manufactured from a raw material containing a refractory composition consisting of components (a) to (c) and an organic binder. In the refractory for casting, a volume shrinkage occurs in association with the transition of a baddeleyite of the clinker from a monoclinic system to a tetragonal system by heating. Conversely, a volume expansion takes place in association with the transition from a tetragonal system to a monoclinic system by cooling to room temperature. As a result of the reversible crystal phase transition of the baddeleyite, micro-cracks capable of mitigating a thermal stress are produced. Furthermore, the thermal expansivity of the refractory for casting of the present invention can be lowered by setting the alumina content of the clinker to an amount as small as 5 to 22 wt %. Owing to the presence of micro-cracks coupled with the reduction in thermal expansivity, the refractory for casting improved in the thermal-shock resistance can be obtained.

On the contrary, since the silica content is increased to be present excessively in the clinker in the form of a glass phase, the excessively provided silica can fill the cracks which are developed from micro-cracks due to the reversible crystal transition of the baddeleyite. As a result, it is possible to obtain a refractory for casting having an excellent corrosion resistance and a high strength.

Hereinbelow, preferable Examples of the present invention will be described in detail.

(EXAMPLES 1–6)

At first, five types of clinkers A to E were prepared in accordance with the chemical compositions listed in Table 1 below. In clinkers B and C, any of the contents of alumina, zirconia and silica falls within the range of the present invention.

TABLE 1

|  | $Al_2O_3$ (wt %) | $ZrO_2$ (wt %) | $SiO_2$ (wt %) |
| --- | --- | --- | --- |
| Clinker A (Comparative Example) | 5 | 50 | 44 |
| Clinker B (Present Invention) | 10 | 50 | 39 |
| Clinker C (Present Invention) | 20 | 50 | 29 |
| Clinker D (Comparative Example) | 25 | 50 | 24 |
| Clinker E (Comparative Example) | 45 | 37 | 17 |

Subsequently, six types of raw materials were prepared by using the clinkers (indicated in Table 1), alumina, silica, graphite and a phenol resin (organic binder), in accordance with the contents shown in Table 2. The raw materials are then individually kneaded and molded by applying a hydrostatic pressure of 1500 kg/cm$^2$, thereby obtaining six types of molded bodies having an annular shape with an outer diameter of 150 mm, an inner diameter of 40 mm, and a highness of 170 mm. The molded bodies thus obtained were sintered at 1000° C. for 5 hours in a nitrogen atmosphere and thereby six types of refractories for casting were manufactured.

Apparent porosity, bulk specific gravity, bending strength, dynamic elastic modulus, thermal expansivity (1000° C.), thermal-shock resistance coefficient, and corrosion resistance index were determined for refractories of examples 1 to 6. The results are shown together in Table 2. A refractory for casting of Standard 1 shown in Table 2 was manufactured in substantially the same manner as in Example 1 except that clinker was not used and alumina, silica, graphite and a phenol resin were used in accordance with the contents shown in Table 2.

The thermal-shock resistance coefficient can be obtained from the following equation. The thermal-shock resistance increases with the magnitude of the value obtained from the equation.

Thermal-shock resistance coefficient=Bending strength/ (Thermal expansivity×dynamic elastic modulus)

The corrosion resistance was evaluated by conducting a corrosion test using a high-frequency induction furnance. The corrosion resistance indexes of the refractories obtained above are indicated by relative values to the corrosion resistance of the Standard 1 (as 100). The corrosion resistance increases with the magnitude of the relative value.

(Comparative Examples 1 to 7)

Seven types of raw materials were prepared from clinkers (indicated in Table 1), alumina, silica, graphite and a phenol resin (organic binder) in accordance with the compositions shown in Table 3. Subsequently, the raw materials were individually kneaded and molded by applying a hydrostatic pressure of 1500 kg/cm$^2$, thereby obtaining seven molded bodies having an annular shape with an outer diameter of 150 mm, an inner diameter of 40 mm, and a highness of 170 mm. The molded bodies were then sintered at 1000° C. for 5 hours in a nitrogen atmosphere and thereby seven types of refractories for casting were manufactured.

Apparent porosity, bulk specific gravity, bending strength, dynamic elastic modulus, thermal expansivity (1000° C.), thermal-shock resistance coefficient, and corrosion resistance index were determined for refractories for casting of Comparative Examples 1 to 7. The results of them are shown in Table 3 together with that of standard 1. The corrosion resistance indexes of refractories for casting of Comparative Examples 1 to 7 are indicated by relative values to the corrosion resistance of standard 1 (as 100).

An accompanying FIGURE shows the relationship of the addition amounts of clinker C versus the thermal expansivity of the refractories for casting, on the basis of the results of Examples 1 to 5 and Comparative Example 1. The same relationship as above obtained from the results of Comparative Examples 4 to 7 are also shown in FIGURE.

TABLE 2

|  | Standard 1 | Example 1 | Example 2 | Example 3 | Example 4 | Example 5 | Example 6 |
| --- | --- | --- | --- | --- | --- | --- | --- |
| Raw materials (wt %) |  |  |  |  |  |  |  |
| Clinker A | 0 | 0 | 0 | 0 | 0 | 0 | 0 |
| Clinker B | 0 | 0 | 0 | 0 | 0 | 0 | 10 |
| Clinker C | 0 | 5 | 10 | 20 | 40 | 60 | 0 |
| Clinker D | 0 | 0 | 0 | 0 | 0 | 0 | 0 |
| Clinker E | 0 | 0 | 0 | 0 | 0 | 0 | 0 |
| $Al_2O_3$ | 60 | 55 | 50 | 40 | 20 | 0 | 50 |
| $SiO_2$ | 10 | 10 | 10 | 10 | 10 | 10 | 10 |
| C (graphite) | 24 | 24 | 24 | 24 | 24 | 24 | 24 |

TABLE 2-continued

|  | Standard 1 | Example 1 | Example 2 | Example 3 | Example 4 | Example 5 | Example 6 |
|---|---|---|---|---|---|---|---|
| Binder* | 18 | 18 | 18 | 18 | 18 | 18 | 18 |
| Properties |  |  |  |  |  |  |  |
| Apparent porosity (%) | 18.6 | 18.7 | 18.0 | 17.1 | 17.5 | 17.0 | 17.8 |
| Bulk specific gravity | 2.39 | 2.39 | 2.40 | 2.41 | 2.43 | 2.44 | 2.39 |
| Bending strength (MPa) | 7.52 | 6.56 | 8.25 | 8.16 | 7.61 | 6.91 | 6.82 |
| Dynamic elastic modulus (GPa) | 10.7 | 9.50 | 9.20 | 10.0 | 11.5 | 12.0 | 10.0 |
| Thermal expansivity (%, 1000° C.) | 0.48 | 0.41 | 0.40 | 0.40 | 0.38 | 0.38 | 0.40 |
| Thermal-shock resistance coefficient ($\times 10^2$) | 1.45 | 1.70 | 2.24 | 2.05 | 1.75 | 1.51 | 1.71 |
| Corrosion resistance index | 100 | 105 | 107 | 107 | 104 | 100 | 101 |

*Binder contained in a raw material is 6 wt % in terms of carbon.

TABLE 3

|  | Standard 1 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Raw materials (wt %) |  |  |  |  |  |  |  |  |
| Clinker A | 0 | 0 | 10 | 0 | 0 | 0 | 0 | 0 |
| Clinker B | 0 | 0 | 0 | 0 | 0 | 0 | 0 | 0 |
| Clinker C | 0 | 2.5 | 0 | 0 | 0 | 0 | 0 | 0 |
| Clinker D | 0 | 0 | 0 | 10 | 0 | 0 | 0 | 0 |
| Clinker E | 0 | 0 | 0 | 0 | 2.5 | 5 | 10 | 20 |
| $Al_2O_3$ | 60 | 57.5 | 50 | 50 | 57.5 | 55 | 50 | 40 |
| $SiO_2$ | 10 | 10 | 10 | 10 | 10 | 10 | 10 | 10 |
| C (graphite) | 24 | 24 | 24 | 24 | 24 | 24 | 24 | 24 |
| Binder* | 18 | 18 | 18 | 18 | 18 | 18 | 18 | 18 |
| Properties |  |  |  |  |  |  |  |  |
| Apparent porosity (%) | 18.6 | 18.0 | 18.1 | 18.0 | 18.6 | 17.6 | 18.8 | 18.2 |
| Bulk specific gravity | 2.39 | 2.41 | 2.40 | 2.40 | 2.40 | 2.42 | 2.39 | 2.39 |
| Bending strength (MPa) | 7.52 | 7.55 | 6.25 | 6.30 | 6.62 | 7.59 | 7.45 | 7.23 |
| Dynamic elastic modulus (GPa) | 10.7 | 10.9 | 9.80 | 9.21 | 9.79 | 9.93 | 9.46 | 9.52 |
| Thermal expansivity (%, 1000° C.) | 0.48 | 0.46 | 0.40 | 0.47 | 0.46 | 0.46 | 0.44 | 0.42 |
| Thermal-shock resistance coefficient ($\times 10^2$) | 1.45 | 1.51 | 1.59 | 1.46 | 1.46 | 1.57 | 1.79 | 1.80 |
| Corrosion resistance index | 100 | 100 | 95 | 103 | 99 | 102 | 101 | 100 |

*Binder contained in a raw material is 6 wt % in terms of carbon.

To clarify the influence of the clinkers indicated in Table 1, each of the refractories for casting of Examples and Comparative Examples shown in Tables 2 and 3 was prepared by reducing only the amount of $Al_2O_3$ and the reduced amount is offset by increasing the content of any one of clinkers A to E.

To describe more specifically, the alumina content of the raw material used in Example 1 is reduced from the composition of Standard 1 by 5 wt % and the amount of clinker C is added by 5 wt %. In the raw material of Example 2, the alumina content is reduced from the composition of Standard 1 by 10 wt % and the reduced amount is offset by 10 wt % of clinker C. In the similar manner, the alumina contents of the raw materials used in Examples 3 and 4 are reduced by 20 wt % and 40 wt %, respectively and the reduced amounts are replaced by 20 wt % and 40 wt % of clinker C, respectively. In the raw material of Example 5, the alumina content of Standard 1 is completely replaced by 60 wt % of clinker C. In the raw material of Example 6, the alumina content is reduced by 10 wt % and the reduced amount is offset by 10 wt % of clinker B.

On the other hand, the amount of clinker C of the raw material used in Comparative Example 1 does not fall within the range (3 to 60 wt %) of the present invention. The raw material of Comparative Example 2 employs clinker A whose chemical composition is outside the range of the present invention. In a similar manner, the raw material of Comparative Example 3 uses clinker D, which falls the outside the range of the composition defined by the present invention. In the raw materials of Comparative Examples 4 to 7, an amount of alumina is reduced from the composition of Standard 1 and the reduced amount is offset by clinker E. The contents of components other than alumina are equal to those of Examples.

As is apparent from Tables 2 and 3, no significant difference is observed in a thermal-shock resistance between the refractory for casting of Comparative Example 1 containing 2.5 wt % of clinker C and that of Standard 1 containing no clinker C.

In contrast, the refractories for casting of Examples 1 to 6 manufactured from raw materials containing clinker B or C in an amount of 3 wt % or more are superior in a thermal-shock resistance and corrosion resistance to those of Comparative Example 1 to 7 which does not contain clinkers B or C in the range of the present invention.

In particular, the refractories for casting of Examples 2 to 5 manufactured from raw materials containing 5 to 40 wt % of clinker C, exhibit a quite excellent thermal-shock resistance and corrosion resistance. Such excellent effects are produced due to the reduction of a thermal expansion coefficient, since clinker C used herein has a low alumina content. The excellent effects may be offered by excessive silica not participated in mullite generation. That is, the excessive silica forms a glass phase and fills cracks developed from micro-cracks which are formed by reversible crystal transition of a baddeleyite, and therefore prevents strength reduction and corrosion of particles constituting the refractory for casting. In the refractories for casting of Examples 1 to 6, it is confirmed that the corrosion resistance is improved. The refractories for casting of Comparative Examples 2 and 3 manufactured from raw materials containing clinker A and D, respectively which are not included in the range of the present invention, exhibit thermal expansivity larger than those of the refractories obtained in Examples 1 to 6.

In the refractory for casting of Comparative Example 2 containing clinker A, which is not included in the range of the present invention, the corrosion resistance index is low since the content of $SiO_2$ of clinker A is high. On the other hand, in the refractory for casting of Comparative Example 3 containing clinker D (not included in the range of the present invention), no apparent effects expected by reduction of thermal expansivity are produced, since a large amount of $Al_2O_3$ is contained in clinker D.

(Examples 7 to 8 and Comparative Examples 8 to 9)

Four types of raw materials were prepared from clinkers (shown in Table 1), zirconia, silicon carbide, a metal silicon, graphite and a phenol resin (organic binder) in accordance with the compositions listed in Table 4. Then, the raw materials were individually kneaded and molded by applying a hydrostatic pressure of 1500 kg/cm², thereby obtaining four molded bodies having an annular shape with an 10 outer diameter of 150 mm, an inner. diameter of 40 mm, and a highness of 170 mm. Subsequently, the molded bodies were sintered at 1000° C. for 5 hours in a $N_2$-gas atmosphere, thereby obtaining four types of refractories for casting.

Apparent porosity, bulk specific gravity, bending strength, dynamic elastic modulus, thermal expansivity (1000° C.), thermal-shock resistance coefficient, corrosion resistance indexes were determined for refractories of Examples 7 to 8 and Comparative Examples 8 to 9. The results of them are shown together with that of standard 2 in Table 4. Standard 2 was prepared in substantially the same manner as in Example 7 except that clinker was not used and zirconia, silicon carbide, a metal silicon, graphite and a phenol resin were used in accordance with the compositions shown in Table 4. The corrosion resistance indexes of refractories for casting of Examples 7 to 8 and Comparative examples 8 to 9 are indicated by relative values the corrosion resistance of standard 2 (as 100). The corrosion resistance increases with the magnitude of the relative value.

TABLE 4

|  | Standard 2 | Example 7 | Example 8 | Comparative Example 8 | Comparative Example 9 |
| --- | --- | --- | --- | --- | --- |
| Raw materials (wt %) | | | | | |
| Clinker A | 0 | 0 | 0 | 5 | 0 |
| Clinker B | 0 | 5 | 0 | 0 | 0 |
| Clinker C | 0 | 0 | 5 | 0 | 0 |
| Clinker D | 0 | 0 | 0 | 0 | 5 |
| $ZrO_2$ | 78 | 73 | 73 | 73 | 73 |
| SiC | 2 | 2 | 2 | 2 | 2 |
| Metalsilicon | 1 | 1 | 1 | 1 | 1 |
| C (graphite) | 15 | 15 | 15 | 15 | 15 |
| Binder* | 12 | 12 | 12 | 12 | 12 |
| Properties | | | | | |
| Apparent porosity (%) | 17.5 | 17.7 | 17.4 | 17.8 | 17.9 |
| Bulk specific gravity | 3.61 | 3.60 | 3.61 | 3.59 | 3.59 |
| Bending strength (MPa) | 6.70 | 7.10 | 7.52 | 6.61 | 6.42 |
| Dynamic elastic modulus (GPa) | 8.81 | 8.52 | 8.43 | 8.79 | 8.87 |
| Thermal expansivity (%, 1000° C.) | 0.49 | 0.47 | 0.44 | 0.47 | 0.49 |
| Thermal-shock resistance coefficient (× 10²) | 1.55 | 1.77 | 2.03 | 1.60 | 1.48 |
| Corrosion resistance index | 100 | 101 | 100 | 95 | 97 |

In each of the refractories for casting listed in Table 4, only the amount of zirconia is reduced from the content of the product of Standard 2 and the reduced amount is offset by any one of clinker A to D. In this way, the influence of clinker is analyzed.

To be more specific, in the raw materials of Examples 7 to 8, the amount of zirconia is reduced from that of Standard 2 by 5 wt % and the amounts of clinkers B and C are added by 5 wt %, respectively.

In the raw materials of Comparative Examples 8 to 9, zirconia is reduced in an amount from that of Standard 2 by 5 wt %, and clinker A and D are increased by 5 wt %.

As is apparent from Table 4, the refractories for casting of Examples 7 to 8 are superior in a thermal-shock resistance and corrosion resistance to those of Standard 2.

In contrast, the refractory for casting of Comparative Example 8 is superior in a thermal-shock resistance but inferior in corrosion resistance in comparison with that of Standard 2. The refractory of Comparative Example 9 is inferior in both thermal-shock resistance and corrosion resistance to that of the Standard 2.

As set forth in the forgoing, according to the present invention, thermal stress is mitigated by the presence of micro-cracks produced by a volume shrinkage and expansion due to the reversible crystal transition from a monoclinic system to a tetragonal system in a baddeleyite of clinker. A thermal expansivity is also reduced by lowering an alumina content in the clinker. Furthermore, cracks developed from the micro-cracks can be filled with excessive silica present in the form of a glass phase. As a result, the present invention made it possible to provide a refractory for casting having an excellent thermal-shock resistance and corrosion resistance and being useful for a high-strength nozzle, side-gate or the like for use in casting steel.

Clinker is a relatively expensive material compared to other components such as a carbon-based material. However, if the preferable clinker in accordance with the present invention is used, a refractory for casting having a low thermal expansivity can be realized even if the content of clinker is low. If the clinker is used in the same amount as the conventional clinker, the resultant refractory for casting can be further reduced in the thermal expansivity.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A refractory for casting manufactured from a raw material containing a refractory composition and an organic binder, wherein said refractory composition comprising
   (a) 3 to 60 wt % of clinker having a mineral crystal phase consisting essentially of mullite and baddeleyite, and containing 5 to 22 wt % of alumina, 38 to 68 wt % of zirconia and 27 to 40 wt % of silica;
   (b) 5 to 40 wt % of at least one carbon-based material selected from the group consisting of graphite and carbon with the proviso that when the organic binder is remained in the form of carbon after sintering, the carbon remained is included in the carbon-based material; and
   (c) at least one refractory element as a balance, selected from the group consisting of alumina, fused silica, zirconia, silicon carbide, mullite and a metal silicon, with the proviso that the amount of silicon carbide is at most 30 wt % and the amount of metal silicon is at most 10 wt %.

2. The refractory for casting according to claim 1, wherein an alumina content of said clinker is from 10 to 20 wt %.

3. The refractory for casting according to claim 1, wherein a zirconia content of said clinker is from 45 to 60 wt %.

4. The refractory for casting according to claim 1, wherein a silica content of said clinker is form 28 to 35 wt %.

5. The refractory for casting according to claim 1, wherein said clinker is contained in said refractory composition in an amount of 5 to 55 wt %.

6. The refractory for casting according to claim 1, wherein said clinker is contained in said refractory composition in an amount of 10 to 40 wt %.

7. The refractory for casting according to claim 1, wherein said carbon-based material is contained in said refractory composition in an amount of 8 to 30 wt %.

8. A method of manufacturing a refractory for casting comprises the steps of:

mixing and kneading a raw material containing an organic binder and a refractory composition containing:
   (a) 3 to 60 wt % of clinker having a mineral crystal phase consisting essentially of mullite and baddeleyite, and containing 5 to 22 wt % of alumina ($Al_2O_3$), 38 to 68 wt % of zirconia ($ZrO_2$) and 27 to 40 wt % of silica;
   (b) 5 to 40 wt % of at least one carbon-based material selected from the group consisting of graphite and carbon with the proviso that when the organic binder is remained in the form of carbon after sintering, the carbon remained is included in the carbon-based material; and
   (c) at least one refractory element as a balance selected from the group consisting of alumina, fused silica, zirconia, silicon carbide, mullite and a metal silicon, with the proviso that silicon carbide is used at most 30 wt % and a metal silicon is used at most 10 wt %, molding the mixture; and sintering a molded body at 800° to 1200° C. in a non-oxidizing atmosphere or with breeze.

* * * * *